United States Patent [19]

Faitel

[11] Patent Number: 4,556,141
[45] Date of Patent: Dec. 3, 1985

[54] RECIPROCATING LINEAR CONVEYOR DRIVE

[75] Inventor: William M. Faitel, Pontiac, Mich.

[73] Assignee: Lamb Technicon Corp., Warren, Mich.

[21] Appl. No.: 524,414

[22] Filed: Aug. 18, 1983

[51] Int. Cl.$^4$ ............................................. B65G 25/00
[52] U.S. Cl. .................................. 198/750; 198/774; 414/749; 74/37; 74/110
[58] Field of Search ............... 198/486, 488, 774, 750, 198/792; 414/749, 750; 74/110, 37; 104/172 R, 173 R, 235, 236

[56] References Cited

U.S. PATENT DOCUMENTS

| | | | |
|---|---|---|---|
| 2,685,260 | 8/1954 | Auger | 74/37 |
| 3,233,750 | 2/1966 | Bannon | 414/753 |
| 4,016,984 | 4/1977 | Pipes | 414/749 |
| 4,118,993 | 10/1978 | Myoshi et al. | 74/37 |
| 4,280,786 | 7/1981 | Dyche | 414/749 |

*Primary Examiner*—Joseph E. Valenza
*Assistant Examiner*—Michael Stone
*Attorney, Agent, or Firm*—Barnes, Kisselle, Raisch, Choate, Whittemore & Hulbert

[57] ABSTRACT

A reciprocating linear drive for conveyors and like applications including a pair of cars mounted for translation on associated tracks. A reversible motor is coupled by a drive chain to the drive car for translating the drive car selectively in either direction through a defined drive stroke. An endless chain loop on the drive car is coupled by sprockets to revolve in one complete cycle during one stroke of the drive car. The conveyor car is coupled by a drag link to the chain loop to obtain uniform velocity of the conveyor car during an intermediate portion of the stroke and terminating in smooth cycloidal acceleration and deceleration at opposing ends of the drive stroke. In one embodiment, a pickup car is carried by the conveyor car and is selectively coupled by rack and pinion assemblies to the drive car for imparting continued motion of the drive car to the pickup car at ends of the stroke when the conveyor car is stationary.

20 Claims, 9 Drawing Figures

RECIPROCATING LINEAR CONVEYOR DRIVE

The present invention is directed to linear drive mechanisms for conveyors and like applications, and more particularly to a reciprocating linear drive mechanism providing smooth cycloidal acceleration and deceleration at opposing ends of the drive stroke.

Reciprocating linear drive mechanisms for conveyors and like applications which provide smooth acceleration and deceleration at opposing ends of the stroke and constant velocity during the intermediate portion of the stroke have previously been proposed in the form of slip clutches, torque converters, hydrostatic drives and other relatively expensive and complex devices. High cost and complexity of such devices make improvements desirable in the area of economy, simplicity and reliability.

An object of the present invention is to provide a reciprocating linear drive mechanism for conveyors and like applications which obtains smooth cycloidal acceleration and deceleration at opposing ends of the drive stroke, and which employs conventional and inexpensive mechanical elements, specifically drive chains, sprockets and links, to obtain the desired velocity and acceleration characteristics.

The invention, together with additional objects, features and advantages thereof, will be best understood from the following description, the appended claims and the accompanying drawings in which:

Figure 1:
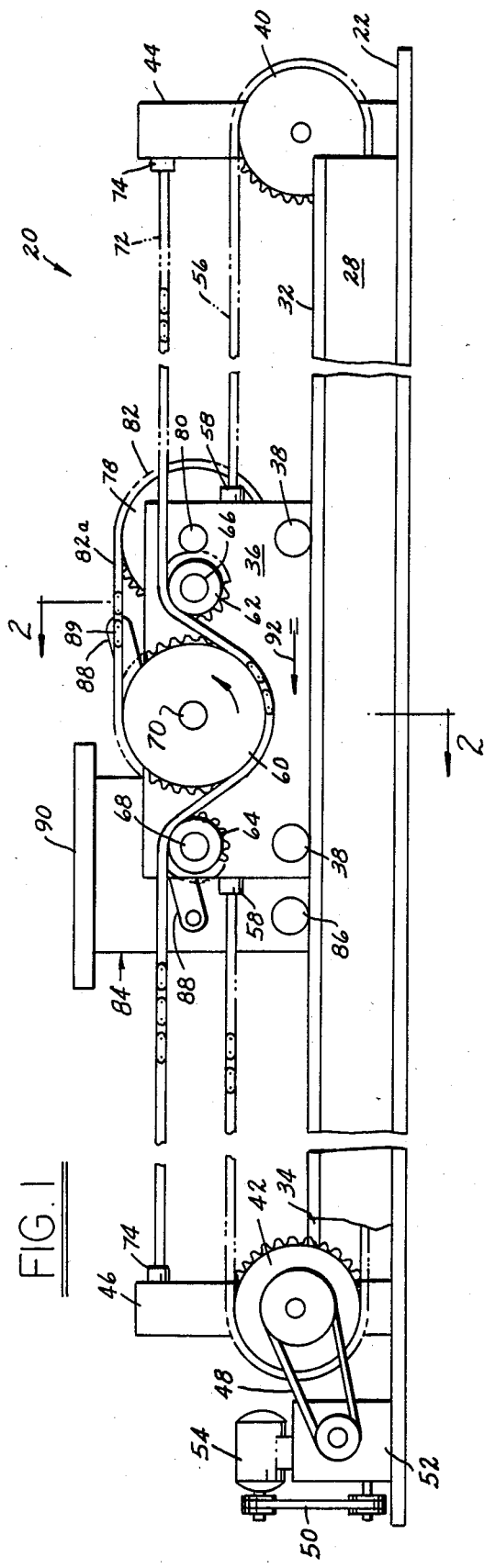
FIG. 1 is an elevational view of a reciprocating linear conveyor which embodies the subject matter of the present invention.
Figure 3:
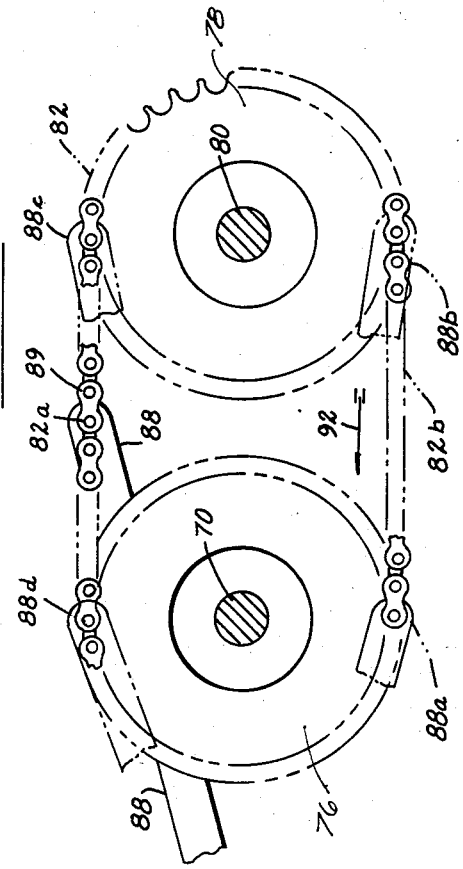
FIG. 3 is a fragmentary sectional view on an enlarged scale taken substantially along the line 3—3 in FIG. 2.
Figure 2:
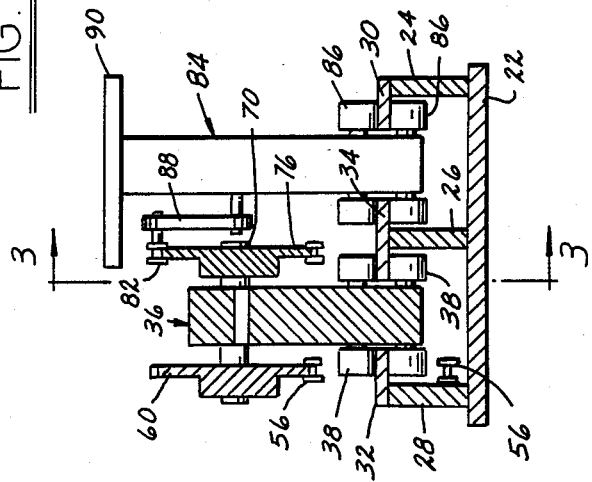
FIG. 2 is a sectional view taken substantially along the line 2—2 in FIG. 1.
Figure 4:
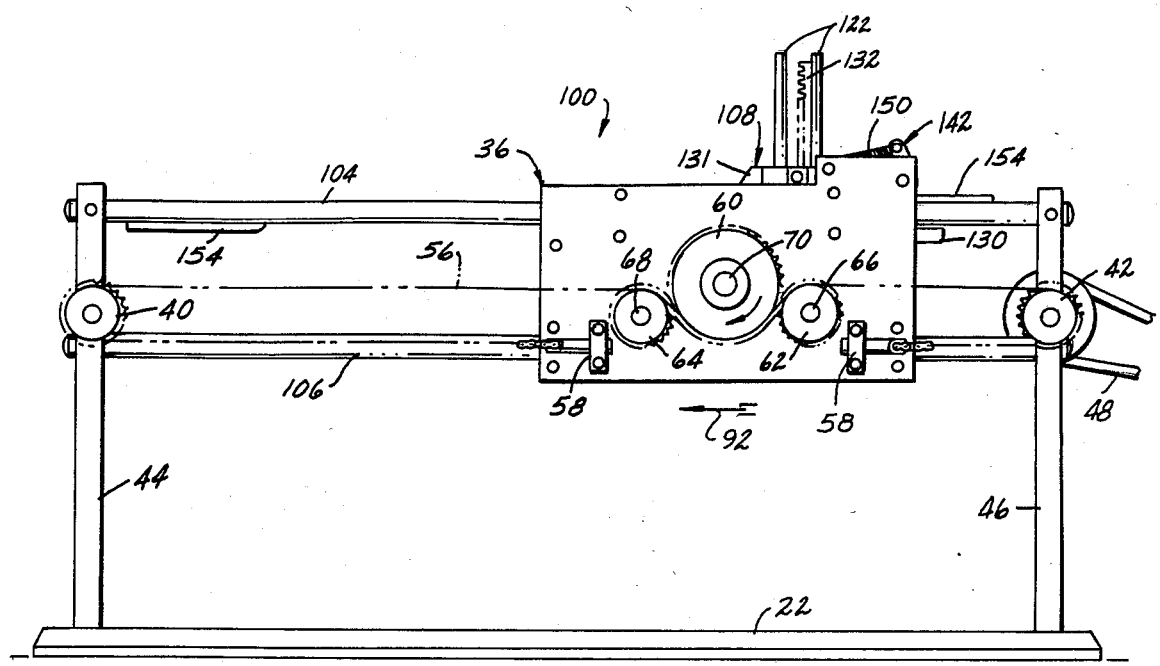
FIG. 4 is a front elevational view of a modified embodiment of the linear conveyor in accordance with the present invention.

FIGS. 1–3 illustrate a reciprocating linear conveyor 20 which embodies the principles of the present invention as comprising three laterally spaced longitudinally extending supports 24,26,28 on a flat base 22. Coplanar tracks are formed by opposed rails 30,32 which project from outside supports 24,28 and a third rail 34 which bridges central support 26. A drive car 36 is mounted by the rollers 38 for linear motion on track rails 32,34. A pair of coplanar sprockets 40,42 are mounted for rotation on associated risers 44,46 at opposed ends of base 22. Sprocket 42 is coupled by the belts 48,50 and the gear reducer 52 to a reversible drive motor 54. A drive chain 56 has its ends affixed at 58 to opposite ends of drive car 36, and a central portion extending beneath track rail 32 (FIG. 2) and looped around sprockets 40,42. Thus, drive car 36 is coupled to reversible motor 54 so as to be driven through a stroke between risers 44,46 selectively in either direction along the track defined by rails 32,34.

A central sprocket 60 and a pair of coplanar idler sprockets 62,64 are mounted on one lateral side of car 36. Sprockets 62,64 are mounted for rotation on associated fixed shafts 66,68, while central sprocket 60 is keyed to a shaft 70 journalled for rotation on drive car 36. A control chain 72 has ends affixed at 74 to risers 44,46 and a central portion looped around idler sprockets 62,64 and central sprocket 60. Thus, central sprocket 60 and associated shaft 70 are rotated by control chain 72 as car 36 is reciprocated along track rails 32,34 by reversible motor 54. A sprocket 76 having a pitch and diameter equal to that of sprocket 60 is mounted on shaft 70 on the opposing side of car 36 so as to rotate with sprocket 60. An idler sprocket 78 identical to sprocket 76 is mounted on a fixed shaft 80 to rotate in the plane of sprocket 76. An endless chain 82 is looped around sprockets 76,78, the upper and lower chain reaches 82a and 82b of chain 82 being parallel to the direction of travel of drive car 36 along track rails 32,34. A conveyor car 84 is mounted by the rollers 86 for linear motion along the track defined by opposed rails 30,34. A drag link 88 is pivotally connected at one end to chain loop 82 and at the opposing end to conveyor car 84. A platform 90 at the upper end of conveyor car 84 is adapted to carry workpieces.

In operation, as drive car 36 is powered in either direction along track rails 32,34 by chain 56, sprocket 60 is rotated by control chain 72 at a linear velocity equal to the velocity of drive car 36. Chain loop 82 is likewise driven by sprockets 60,76 and shaft 70. In the embodiment described, the velocity of the upper reach 82a of chain loop 82 is twice the velocity of drive car 36 and the velocity of lower chain reach 82b is zero, both velocities being relative to support 22. Drag link 88 is affixed to chain 82 such that the link-chain connection is positioned at opposite ends of lower chain reach 82b, as illustrated at 88a and 88b in FIG. 3, at opposite ends of the stroke of drive car 36. As drive car 36 is displaced by motor driven chain 56 in the direction of arrow 92 in FIGS. 1 and 3, sprockets 76,78 rotate counterclockwise and are simultaneously displaced in the direction 92. However, since the velocity and direction of movement of the lower chain reach 82b are equal and opposite to the velocity and direction of movement of drive car 36, conveyor car 84 remains stationary until the drag link connection to chain 82 advances from the position 88a to the position 88b in FIG. 3, at which point the drag link begins to accelerate the conveyor car until the link connection reaches the point 88c which defines one end of the upper reach 82a of chain loop 82. From this point, the velocity of conveyor car 84 is uniform at twice the velocity of drive car 36 in direction 92. Between the positions illustrated at 88b and 88c, the acceleration of conveyor car 84 is smooth and cycloidal, thus avoiding sudden jerks and shocks on workpieces carried on platform 90. The spacing between shafts 70,80, the diameter of sprockets 76,78 and thus the length of chain loop 82 are selected such that the connection of drag link 88 to chain loop 82 circles sprocket 76 and advances to position 88b when drive car 36 reaches the end of its stroke in direction 92. Between the positions 88d and 88a in FIG. 3, conveyor car 84 is smoothly decelerated along the path of a cycloidal curve. After the connection position 88a, the conveyor car is stationary as the drag link connection moves to the position 88b. Motor 54 may then be reversed and the cycle repeated in the opposite direction with a dwell at the beginning and end of the stroke in the opposite direction. The length of chain loop 82 determines the length of stroke of conveyor car 84 in relation to the length of stroke of drive car 36. The diameter of sprockets 76,78 determines the length of the accelerating and decelerating portions of the conveyor car stroke, and the length of the chain reaches 82a and 82b determine the length of the constant velocity and dwell portions of the conveyor car stroke.

Thus, it will be noted that any sudden jerks during acceleration and deceleration of the drive car at opposing ends of its stroke are effectively isolated from conveyor car 84, which is stationary at these times. Moreover, displacement of the conveyor car by the drag link connection which follows the arc of a circle between positions 88b,88c and 88d,88a in FIG. 3 results in smooth cycloidal acceleration and deceleration, as described. Assuming that the velocity of drive car 36 is uniform during the major intermediate portion of its stroke, which is preferable, the velocity of conveyor car 84 is likewise uniform and twice that of drive car 36 during the major portion of the stroke of the conveyor car.

It will also be appreciated that in the event a dwell is not desired at the opposite ends of the stroke of conveyor car 84, then the stroke of drive car 36 is designed such that in one direction the drag link connection travels the path 88a,88d,88c,88b and in the opposite direction back through the reverse path to position 88a. In this case, the velocity of the conveyor car at the intermediate portion of its stroke can be at any desired ratio in relation to the velocity of the drive car, as determined by the relative diameters of sprockets 60,70.

In FIGS. 4–9, which illustrate a modified reciprocating linear conveyor drive 100 embodying the principles of the present invention, reference numerals identical to those used in FIGS. 1–3 illustrate functionally corresponding elements. Drive car 36 is mounted by a plurality of slide bearings 102 to a pair of vertically spaced rods 104,106 extending between risers 44,46. Conveyor car 108 is likewise mounted by slide bearings 110 (FIG. 9) to rods 104,106, which thus form the track for both the drive and conveyor cars. Drive chain 56a has its opposite ends affixed at 58 to drive car 36 as in the embodiments of FIGS. 1–3, and is also looped around sprockets 60,62,64 so as to function both as the drive chain 56b and as the control chain 72 in the embodiment of FIGS. 1–3. Chain loop idler sprocket 78 is mounted on car 36 by an angularly adjustable plate 112 (FIG. 7) for adjusting tension in the loop chain 82. Loop chain 82 is coupled to conveyor car 108 by the drag link 88, and reciprocating of conveyor car 108 by drive car 36 and drive chain 56 is generally identical to that of FIGS. 1–3. However, since drive chain 56a both drives car 36 and rotates sprocket 60, sprocket 60 is of larger diameter than sprockets 76,78 in order to impart to loop chain 82 the same linear velocity as chain 56a.

FIGS. 4–9 also illustrate a modification wherein a third car, such as a pickup car 120, is carried by conveyor car 108 and is operatively coupled to the drive mechanism for motion with respect to conveyor car 108 at opposing ends of the drive stroke. Specifically, pickup car 120 includes a pair of rods 122 slidable in guides (not shown) on conveyor car 108 so as to permit upward and downward sliding motion of pickup car 120 with respect to the conveyor car. A pinion gear 124 (FIG. 9) is keyed to a shaft 126 on the side of car 108 facing drive car 36. Shaft 126 is journalled on car 108 and has a disc 127 fixedly mounted to the end thereof on the opposing side of car 108. A pair of opposed parallel racks 128,130 are mounted on car 108 within a keeper 131 (FIG. 9) for sliding motion parallel to track rods 104,106 and engage pinion 124 on opposite sides thereof. A third rack 132 is pivotally mounted at 134 to pickup car 120. Rack 132 is held by a keeper 138 in engagement with an idler gear 136 eccentrically and fixedly mounted on disc 127. Thus, rotation of pinion 124 by rack 128 or 130 functions through disc 127, eccentric gear 136 and rack 132 to propel pickup car 120 vertically upwardly or downwardly with respect to conveyor car 108 on the path defined by slide rods 122. A roller 160 (FIG. 9) is mounted on an adjustable spring arm 162 at a position on car 108 to engage a notch 164 in the periphery of disc 127.

A pair of bell crank levers 140,142 are mounted on drive car 36 for selectively reciprocating racks 128,130 and thus reciprocating pickup car 120 at opposing ends of the drive stroke. Each lever 140,142 is mounted by a pivot pin 146 to drive car 36. A gear rack segment 148 is mounted on the end of each bell crank arm 144, the gear segment on lever 140 being opposed to lower rack 130 and the gear segment 148 on lever 142 being opposed to upper rack 128. The end of arm 145 of each bell crank is biased by a spring 150 such that the associated gear segment 148 is normally spaced from the opposing rack 128,130. A follower roller 152 is mounted on each arm 144 in a position to engage an associated linear cam 154 positioned at each end of track rod 104 so as to pivot the associated arm 144 and bring the corresponding gear segment 148 into engagement with the opposing rack 128,130.

Figure 5:
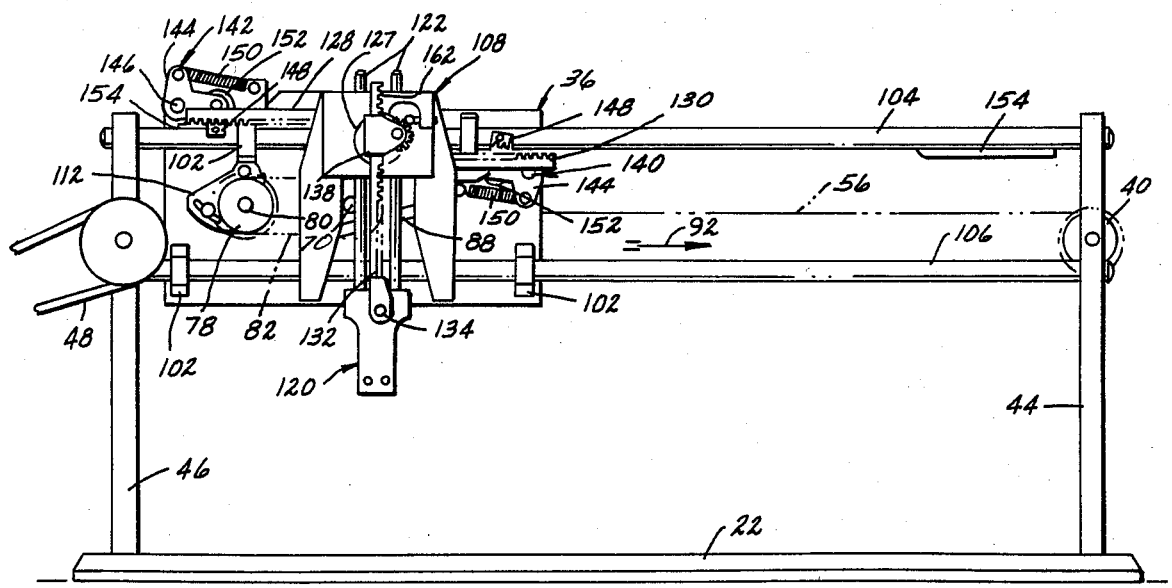
FIGS. 5–8 are rear elevational views of the conveyor of FIG. 4 at successive stages of operation during one drive stroke.
Figure 6:
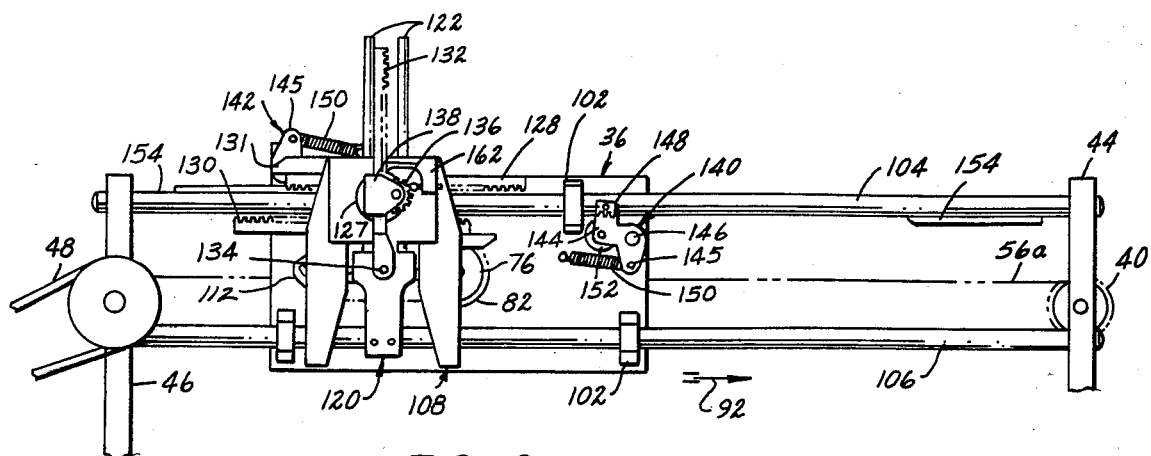

One complete cycle of operation is illustrated in successive FIGS. 5–8. In FIG. 5, drive car 36 and conveyor car 108 are at the extreme left-hand end of a drive stroke. The roller 152 on lever 142 is engaged by cam 154 on track rod 104, so that the associated gear segment 148 is engaged with upper rack 128. Pickup car 120 is in the fully lowered position and roller 160 (FIG. 9) is seated in notch 164. Drag link 88 is at the position 88a in FIG. 3. As drive car 36 is initially propelled by drive chain 56 to the right in direction 92, drag link 88 is at the position 88a of chain loop 82 (see FIG. 3) so that conveyor car 108 remains stationary with respect to support 22 and risers 44,46 as previously described. At the same time, rightward motion of drive car 36 operates through lever 142, rack 128, pinion 124 and shaft 126 to rotate disc 127 clockwise as viewed in FIGS. 5 and 6. Such rotation of disc 127 operates through gear 136 and rack 132 to raise pickup car 120. Gear 136, which is fixed on disc 127, revolves clockwise as viewed in FIGS. 5 and 6, and consequently imparts a smooth vertical acceleration to pickup car 120. Thus, initial rightward motion of drive car 36 functions to raise pickup car 120 up to the position illustrated in FIG. 6. As roller 152 on lever 142 moves out of engagement with cam 154, gear section 148 is pivoted by spring 150 out of engagement with upper rack 128. At this point, disc 127 has rotated one revolution clockwise and pickup car 120 is thus decelerated smoothly to its raised position shown in FIG. 6. The smooth vertical acceleration and deceleration of pickup car 120 is obtained by orienting disc 127 such that gear 136 is offset 90° from top dead center in a clockwise direction at the upper and lower ends of the stroke of the pickup car. When pickup car 120 reaches its uppermost position, the drag link connection to chain loop 82 has preferably advanced to position 88b (in FIG. 3) so that, with the pickup car fully raised, the conveyor car 108 begins to move in the direction 92 as propelled by drive car 36 in the manner previously described. Roller 160 again engages notch 164 (FIG. 9) so as to hold pickup car 120 in the fully raised position.

Figure 7:
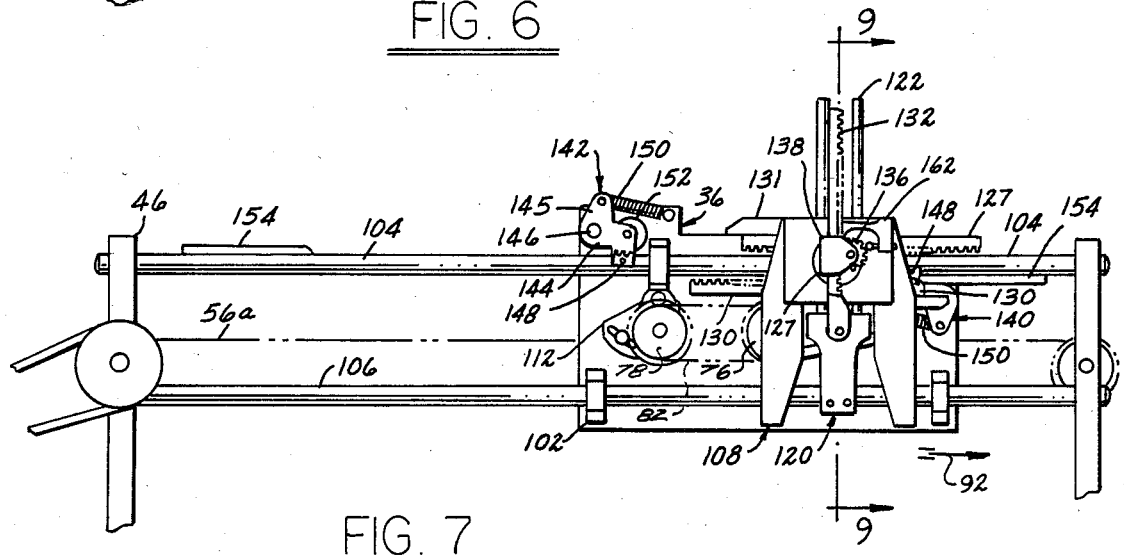
Figure 8:
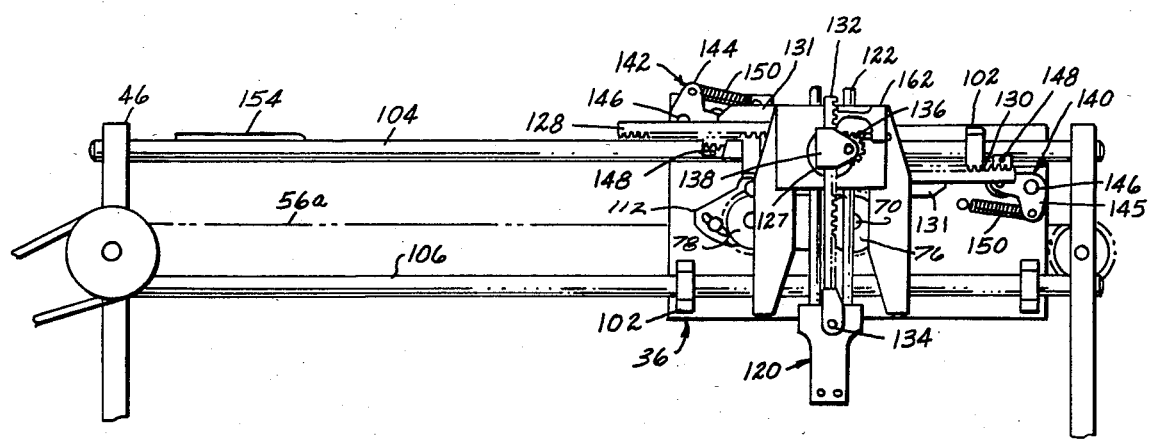
Figure 9:
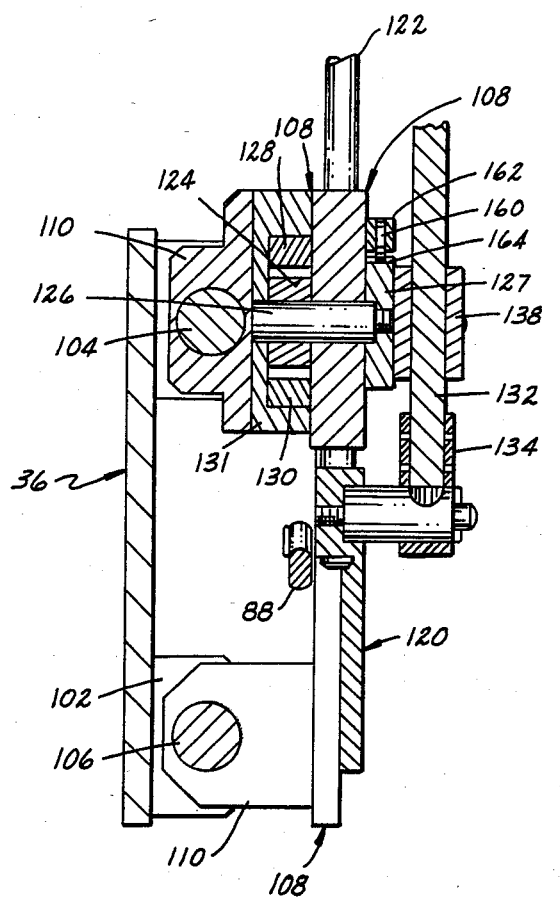
FIG. 9 is a fragmentary sectional view on an enlarged scale taken substantially along the line 9—9 in FIG. 7.

As the drive car approaches the opposing or righthand end of the drive stroke (FIG. 7) and the drag link connection lever 140 engages cam 154 on the other end of track rod 104 so as to pivot the associated gear segment 148 counterclockwise in FIG. 7 into engagement with the adjacent end of rack 130. As previously described in connection with FIG. 3, the conveyor car 108 is stationary at this point. Continued motion of drive car 36 in the direction 92 effects corresponding rightward translation of rack 130, which rotates disc 127 in the counterclockwise direction. Gear 136 revolves counterclockwise with disc 127, and lowers pickup car 120 by means of gear 136 and rack section 132 as drive car 36 approaches the righthand limit of its stroke. At the righthand limit of the drive stroke illustrated in FIG. 8, lower rack 130 is fully extended in the righthand direction and pickup car 120 is fully lowered. Roller 160 is again seated in notch 164 (FIG. 9). Drive motor 54 (FIG. 1) may then be reversed, and the entire stroke is repeated in the opposite direction.

In the preferred construction of the embodiment of FIGS. 4–9, cam elements 154 are positioned on track rod 104 so as to be engaged by the corresponding rollers of the opposing bell crank levers 140,142 only when conveyor car 108 is stationary. However, it is possible in some applications that the cam elements 154 may be adjusted toward each other so as to cause vertical motion of the pickup car as the conveyor car is decelerating but not fully stopped. As previously indicated, the speed of the conveyor car during the intermediate portion of the drive stroke is a function of the ratio of the various sprocket diameters, and may be adjusted or selected as desired depending upon the length of the stroke and other factors.

The invention claimed is:

1. A linear drive for conveyors and like applications comprising first and second cars; track means supporting said cars for motion in adjacent linear paths; power means for driving said first car through a defined stroke selectively in either direction in the associated said path; cycloidal drive means coupling said second car to said first car for driving said second car through an associated said path at uniform velocity in an intermediate portion of said stroke and with smooth cycloidal acceleration and deceleration adjacent to opposing ends of said stroke, said cycloidal drive means comprising endless drive means mounted on said first car and means coupling said endless drive means to said second car; and means coupling said power means to said cycloidal drive means for driving said endless drive means through a closed path which includes longitudinal reaches parallel to said linear paths at a velocity in said intermediate portion of said stroke equal to a constant times the velocity of said first car is said intermediate portion of said stroke with cycloidal acceleraton and deceleration from and to zero velocity as said first car approaches opposing ends of said stroke.

2. The linear drive set forth in claim 1 wherein said cycloidal drive means comprises a pair of sprockets carried by said first car for rotation about longitudinally spaced axes, an endless chain looped around said sprockets, means coupling one of said sprockets to said power means, and a drag link coupling said chain to said second car.

3. The linear drive set forth in claim 2 wherein said means coupling one of said sprockets to said power means comprises a second chain extending parallel to said paths, a third sprocket carried by said first car and rotatably coupled to said one of said sprockets, and means training said second chain around at least a portion of said third sprocket such that motion of said second chain relative to said first car results in rotation of said third sprocket and motion of said endless chain through said closed path.

4. The linear drive set forth in claim 3 further comprising fixed means at opposing ends of said path, and wherein said power means comprises a drive sprocket mounted on one of said fixed means, an idler sprocket mounted on the opposing said fixed means, and a chain having ends affixed to said first car and an intermediate portion trained around said drive and idler sprockets.

5. The linear drive set forth in claim 4 wherein said last-named chain comprises said second chain.

6. The linear drive set forth in claim 4 wherein said second chain has opposed ends fixed to said fixed means and an intermediate portion trained around at least a portion of said third sprocket.

7. The linear drive set forth in claim 3 wherein said third sprocket and said one of said sprockets are mounted on a common shaft, said constant being a function of the diameter ratio of said third sprocket and said one of said sprockets.

8. The linear drive set forth in claim 1 further comprising a third car carried by said second car, and means for coupling said third car to said power means to drive said third car through a linear path with respect to said second car at opposing ends of said stroke.

9. The linear drive set forth in claim 8 wherein said means coupling said third car to said power means includes means for driving said third car through its linear path only at opposing ends of said stroke when said second car is stationary.

10. The linear drive set forth in claim 8 wherein said means coupling said third car to said power means comprises pinion means carried by said second car operatively coupled to said third car, gear rack means carried for translation on said second car and engaged with said pinion means, and coupling means carried by said first car for selectively engaging said rack means at opposing ends of said stroke.

11. The linear drive set forth in claim 10 wherein said last-mentioned means comprises cam means in fixed position with respect to said track means adjacent to opposing ends of said stroke and means pivotally mounted on said first car in position to be engaged by said cam means for selectively engaging said rack means so as to impart motion of said first car to said third car through said rack and pinion means.

12. The linear drive set forth in claim 11 wherein said cam means are positioned with respect to said track means so as to engage said pivotal means only when said second car is stationary at opposed ends of said stroke.

13. The linear drive set forth in claim 11 wherein said rack means comprises opposed racks parallel to said track means, wherein said cam means includes first and second cam means disposed at opposite ends of said stroke, and wherein said pivotally mounted means includes first and second cam followers carried at opposite ends of said first car and respectively engageable with said first and second cam means for engaging an associated one of said first and second racks.

14. The linear drive set forth in claim 11 wherein said second car includes a guideway and a drive gear rotatably coupled to said pinion means, and wherein said third car includes means slidably disposed in said guideway and a rack coupled to said drive gear for propelling said third car with respect to said second car.

15. The linear drive set forth in claim 14 wherein said drive gear is eccentrically mounted with respect to said pinion means.

16. A linear drive for conveyors and like applications comprising separate drive and conveyor cars supported on associated tracks for motion in adjacent parallel paths, reversible power means for driving said drive car through a defined stroke selectively in opposite directions in the associated said path, a pair of sprockets carried by said drive car for rotation about longitudinally spaced axes, an endless chain looped around said sprockets so as to form upper and lower chain reaches between said sprockets parallel to said paths, means coupling one of said sprockets to said power means for rotating said sprockets and said endless chain at a velocity proportional to velocity of said drive car, and a drag link coupled between said conveyor car and said chain loop at a point on said chain loop so as to be disposed in one of said chain reaches when said drive car is at one end of said stroke.

17. The linear drive set forth in claim 16 wherein diameters of said sprockets and spacing between said axes are such that said point of connection between said drag link and said chain is disposed in the same said chain reach at the opposing end of said stroke.

18. The linear drive set forth in claim 17 wherein said power means is coupled to said one of said sprockets such that links of said chain in one of said chain reaches move at the same velocity and in the same direction as the first car, and wherein said drag link is coupled to said chain such that said point of connection is disposed in said last-mentioned chain reach at each end of said stroke.

19. A linear drive for a conveyor or the like comprising
   first and second cars and track means for guiding said cars in reciprocating, generally parallel paths,
   means for reciprocating said first car through a predetermined stroke,
   drive means on said first car rotated in response to movement thereof in said path,
   a sprocket on said first car driven by said drive means for rotation about a first axis perpendicular to said path of travel,
   a second sprocket journalled on said first car for rotation about a second axis parallel to and spaced from said first axis in the direction of said path,
   an endless chain trained around said sprockets and
   a link having one end connected with a section of said chain and its other end connected with said second car whereby said second car is reciprocated through its stroke in response to reciprocation of the first car,
   said chain-link connection being arranged such that it traverses the arcuate peripheries of the two sprockets as the second car approaches or advances from the opposite ends of its stroke whereby to impart smooth acceleration and deceleration to the second car at opposite ends of its stroke and a velocity proportional to the velocity of the first car at the intermediate portion of its stroke.

20. The linear drive set forth in claim 19 wherein the speed of rotation of the driven member is related to the linear velocity of the first car and said first gear such that one linear reach of the chain travels at a velocity twice that of the first car in the same direction and the other linear reach of the chain travels at zero velocity relative to the first car whereby a dwell is imparted to the second car at opposite ends of its stroke.

* * * * *